(12) United States Patent
Errore et al.

(10) Patent No.: US 11,501,752 B2
(45) Date of Patent: Nov. 15, 2022

(54) ENHANCED REPRODUCTION OF SPEECH ON A COMPUTING SYSTEM

(71) Applicant: International Business Machines Corporation, Armonk, NY (US)

(72) Inventors: Stefania Errore, Rome (IT); Marco De Gregorio, Rome (IT); Agostino Colussi, Rome (IT); Gianluca Gargaro, Rome (IT); Salvatore Matrone, Albano Laziale (IT)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/152,960

(22) Filed: Jan. 20, 2021

(65) Prior Publication Data

US 2022/0230624 A1    Jul. 21, 2022

(51) Int. Cl.
| | | |
|---|---|---|
| *G10L 13/08* | (2013.01) | |
| *G06F 40/30* | (2020.01) | |
| *G10L 15/18* | (2013.01) | |
| *G10L 25/60* | (2013.01) | |
| *H04L 65/60* | (2022.01) | |
| *G10L 15/22* | (2006.01) | |
| *G10L 13/033* | (2013.01) | |
| *H04W 84/04* | (2009.01) | |

(52) U.S. Cl.
CPC .............. *G10L 13/08* (2013.01); *G06F 40/30* (2020.01); *G10L 13/033* (2013.01); *G10L 15/1815* (2013.01); *G10L 15/22* (2013.01); *G10L 25/60* (2013.01); *H04L 65/60* (2013.01); *H04W 84/042* (2013.01)

(58) Field of Classification Search
CPC ... G10L 13/033; G10L 13/08; G10L 15/1815; G10L 15/22; G10L 25/60; H04L 65/60; G06F 40/30; H04W 84/042
See application file for complete search history.

(56) References Cited

U.S. PATENT DOCUMENTS

| | | | |
|---|---|---|---|
| 6,389,391 B1 * | 5/2002 | Terauchi | G10L 19/012 704/226 |
| 9,626,955 B2 * | 4/2017 | Fleizach | G10L 13/08 |
| 10,791,404 B1 * | 9/2020 | Lasky | G10L 25/27 |
| 2001/0049602 A1 * | 12/2001 | Walker | G10L 13/08 704/E13.011 |

(Continued)

FOREIGN PATENT DOCUMENTS

| | | |
|---|---|---|
| CN | 1573920 A | 2/2005 |
| CN | 106575502 A | 4/2017 |
| CN | 111128214 A | 5/2020 |

OTHER PUBLICATIONS

International Search Report and Written Opinion, International Application No. PCT/CN2022/070394, International Filing Date Jan. 5, 2022.

*Primary Examiner* — Eric Yen (74) *Attorney, Agent, or Firm* — Gilbert Harmon, Jr.

(57) ABSTRACT

An approach for enhancing speech reproduction based on recognizing text segments from sound segments of an audio signal. Enhanced text segments are generated from any text segments whose quality indicators do not reach a threshold level, and enhanced speech segments are synthetized from the enhanced text segments. An enhanced sound is reproduced comprising enhanced sound segments based on the enhanced speech segments.

20 Claims, 6 Drawing Sheets

(56) References Cited

U.S. PATENT DOCUMENTS

| | | | |
|---|---|---|---|
| 2002/0194002 A1 | 12/2002 | Petrushin | |
| 2009/0187407 A1* | 7/2009 | Soble | G10L 15/26 704/E13.011 |
| 2012/0016674 A1* | 1/2012 | Basson | G10L 19/0018 704/258 |
| 2014/0039895 A1* | 2/2014 | Aravamudan | G10L 15/187 704/257 |
| 2014/0280272 A1* | 9/2014 | Choque | G06F 16/137 707/758 |
| 2015/0334156 A1* | 11/2015 | Juilliart | H04N 7/15 348/14.12 |
| 2016/0379626 A1* | 12/2016 | Deisher | G10L 15/30 704/235 |
| 2017/0078479 A1* | 3/2017 | Feast | H04M 3/562 |
| 2017/0148469 A1 | 5/2017 | Furuta | |
| 2017/0344709 A1* | 11/2017 | Dey | G16H 10/60 |
| 2018/0247646 A1 | 8/2018 | Meacham | |
| 2019/0035420 A1 | 1/2019 | Kirihara | |
| 2019/0179908 A1* | 6/2019 | Nakao | G06F 40/51 |
| 2019/0198022 A1* | 6/2019 | Varner | G10L 25/57 |
| 2019/0312797 A1* | 10/2019 | Sen | H04L 43/0817 |
| 2020/0043509 A1 | 2/2020 | Chen | |
| 2020/0160845 A1 | 5/2020 | Lavilla | |
| 2022/0101830 A1* | 3/2022 | Freed | G10L 15/063 |

\* cited by examiner

ENHANCED REPRODUCTION OF SPEECH ON A COMPUTING SYSTEM

BACKGROUND

The present disclosure relates to the information technology field. More specifically, this disclosure relates to the reproduction of speech.

Computing systems are commonly used to output (digital) contents in different formats. Particularly, one of the most effective formats for conveying information to users of the computing systems is speech; for this purpose, most computing systems are provided with devices, such as loudspeakers, for reproducing sounds comprising speeches from corresponding audio signals.

A typical example is a voice call or a conference call that are used to provide a live exchange of sounds among two users or more users, respectively, of corresponding computing systems (referred to as participants) over a telecommunication network, possibly with additional sharing of multimedia contents, such as video, images, data, documents and so on; commonly, each voice/conference call is performed over the Internet (for example, by exploiting VOIP technology), so as to allow the participants to communicate from remote locations that are dispersed geographically. The calls make it possible to discuss topics of common interest in a time and cost effective way (without the need of meeting face-to-face, which generally would require long travels by the participants to reach a common physical location); this has become even more important in the last period, because of the widespread adoption of smart working in many offices.

An effectiveness of each call significantly depends on a quality of the reproduction of the speech of each participant to the call (contained in the corresponding sound that is received by the other participants to the call); indeed integrity and fidelity of the reproduction of the speech is important to ensure that each participant speaking in the call is understood by all the other participants listening to him/her.

However, several factors may adversely affect the reproduction of the speech in the call. For example, noise present in the background wherein each participant is speaking merges with his/her speech into the corresponding sound that is transmitted to the other participants; this noise may hinder the understanding of the content of the speech. Noise reduction techniques may then be used to remove (at least in part) the noise from the sound. Particularly, passive techniques (such as soundproofed rooms) may be used to reduce the generation of noise at the locations of the participants; however, these techniques are very expensive and difficult, if not impossible, to implement in many situations (such as in private contexts). Active techniques may be used to reduce the noise either in the sound that is transmitted or in the sound that is received. For example, it is possible to apply destructive interference techniques to reduce the noise in the sound at the locations of the participants that are speaking and/or filtering techniques to reduce the noise in the sound at the locations of the participants that are listening.

In any case, the quality of the speech that is received may be adversely affected by the performance of the telecommunication network that is used to transmit the corresponding audio signal. Indeed, poor performance of the telecommunication network (for example, low speed, high traffic and so on) generates artifacts that degrade the quality of the speech; for example, the speech may become noisy, distorted, intermittent and so on.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of synthetizing the speech from an enhanced text recognized from the speech.

Particularly, an embodiment provides a method for enhancing speech reproduction. The method comprises recognizing text segments from sound segments of an audio signal. Enhanced text segments are generated from any text segments whose quality indicators do not reach a threshold level, and enhanced speech segments are synthetized from the enhanced text segments. An enhanced sound is reproduced comprising enhanced sound segments based on the enhanced speech segments.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its properties, like value, content and representation).

DETAILED DESCRIPTION

With reference in particular to FIG. 1A-FIG. 1D, the general principles are shown of embodiments of the present disclosure.

Figure 1A:
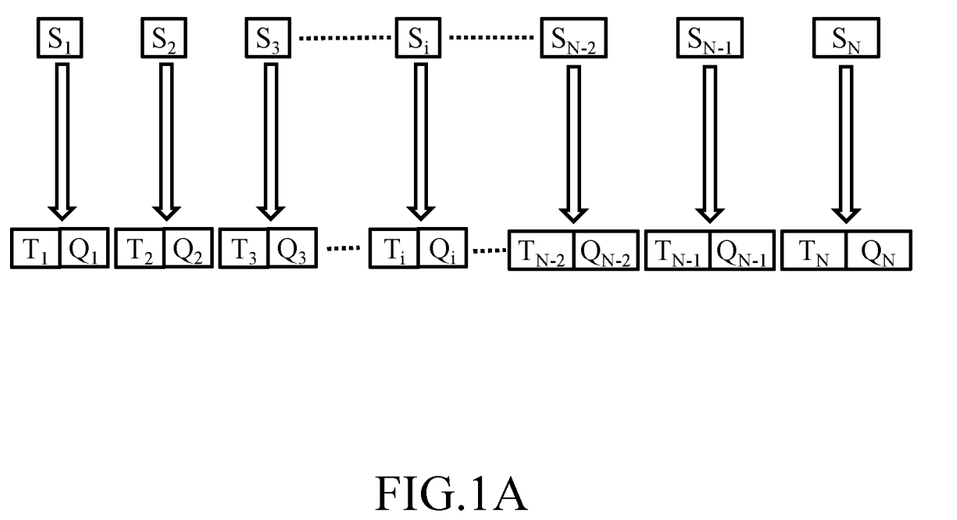
FIG. 1A-FIG. 1D show the general principles of the solution according to an embodiment of the present disclosure.

Starting from FIG. 1A, a user (participant) of a computing system can participate in a call over a telecommunication network (for example, a conference call among a plurality of participants that are generally dispersed geographically so as to be remote one to another). During the call, the participant may either speak or listen; in the latter case, the computing system receives an audio signal (in a digital form readable by the computing system) that represents a sound (i.e., pressure waves generated by vibrations) comprising a speech of the other participants when speaking (i.e., vocal communication in a human language, defined by a structured system understood by a community, such as English). A text (representing the speech in a form readable by human beings) can be recognized from the audio signal; the text can comprise a sequence of text segments $T_i$, with i=1 . . . N (such as words and pauses) that can be recognized from a corresponding sequence of speech segments $S_i$ of the sound. At the same time, corresponding quality indicators $Q_i$ can be determined for the text segments $T_i$; quality indicators $Q_i$ can provide an indication of a correctness of corresponding text segments $T_i$ to represent the speech segment $S_i$ from which it has been recognized.

Figure 1B:
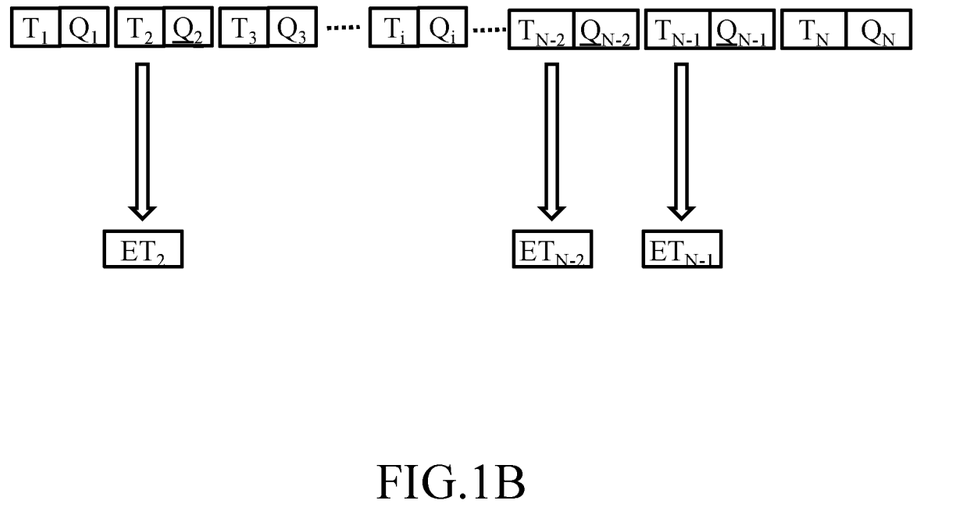

Moving to FIG. 1B, according to embodiments of the present disclosure, corresponding enhanced text segments $ET_i$ can be generated from any text segments $T_i$ (underlined in the figure) whose quality indicators $Q_i$ do not reach a threshold level (meaning their correctness to represent the corresponding text segment $T_i$ is too low); the enhanced text segments $ET_i$ can be generated according to additional information with respect to the corresponding speech segments Si, for example, a context of the speech inferred from the text.

Figure 1C:
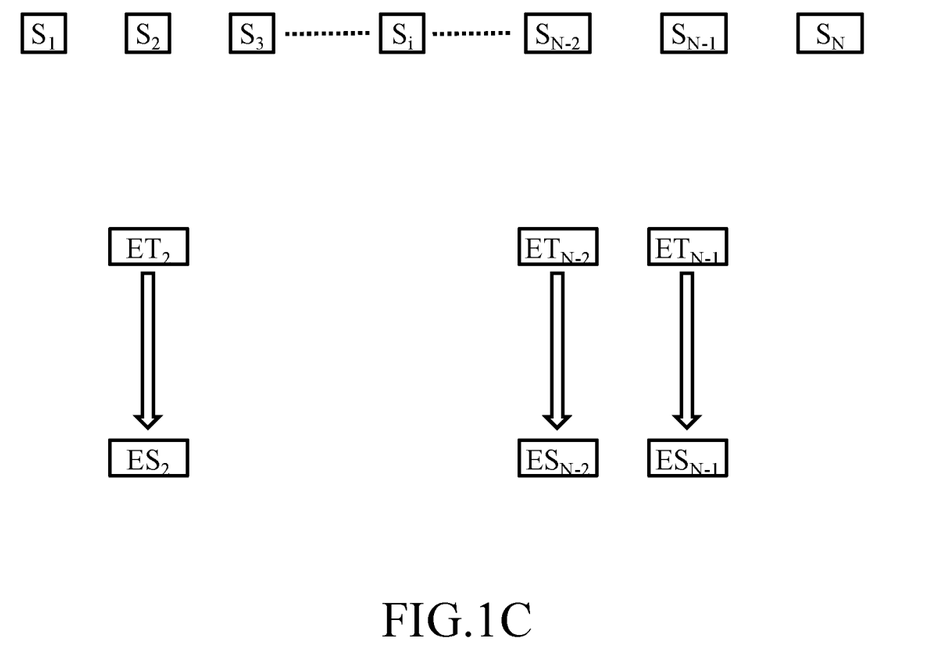

Moving to FIG. 1C, corresponding enhanced speech segments $ES_i$ can be synthetized from the enhanced text segments $ET_i$.

Figure 1D:
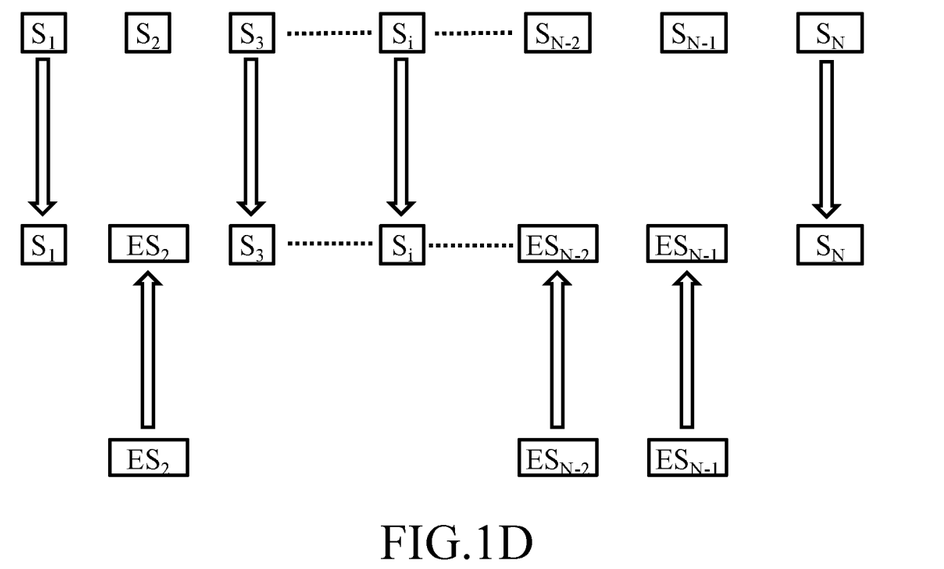

Moving to FIG. 1D, an enhanced sound can be reproduced. The enhanced sound can comprise the sound segments $S_i$ and enhanced sound segments that can be based on the enhanced speech segments $ES_i$ (for example, obtained by mixing their speech with a background of the corresponding segments $S_i$); particularly, the sound segments $S_i$ can be reproduced for the text segments $T_i$ whose quality indicators $Q_i$ reach the threshold level and the enhanced sound segments (based on the enhanced speech segments $ES_i$) can be reproduced for the text segments $T_i$ whose quality indicators $Q_i$ do not reach the threshold level. Accordingly, the enhanced sound can provide the (original) voices of the participants (when understandable); however, whenever the voices of the participants become difficult to understand, they can be replaced by corresponding synthetized voices reproducing their inferred content.

The above-described embodiments can significantly increase quality of the call. Indeed, in this way it is possible to remove (or at least substantially attenuate) the effects of any artifacts in the sound making it noisy, distorted, intermittent and so on (because of either noise added in the background or poor performance of the telecommunication network). Accordingly, it can be easier for the participants to understand the speech; as a result, it can become simpler for the participants to listen to the speech and then to concentrate on its content, with reduced risk of missing key points thereof.

The increased quality of the call can also avoid (or at least substantially reduce) the need for additional exchanges of information over the telecommunication network (for example, for re-sending poor quality or completely lost portions of the speech); this can limit consumption of corresponding network resources, and possible degradations of the performance of the telecommunication network (with beneficial effects for all network users).

Figure 2:
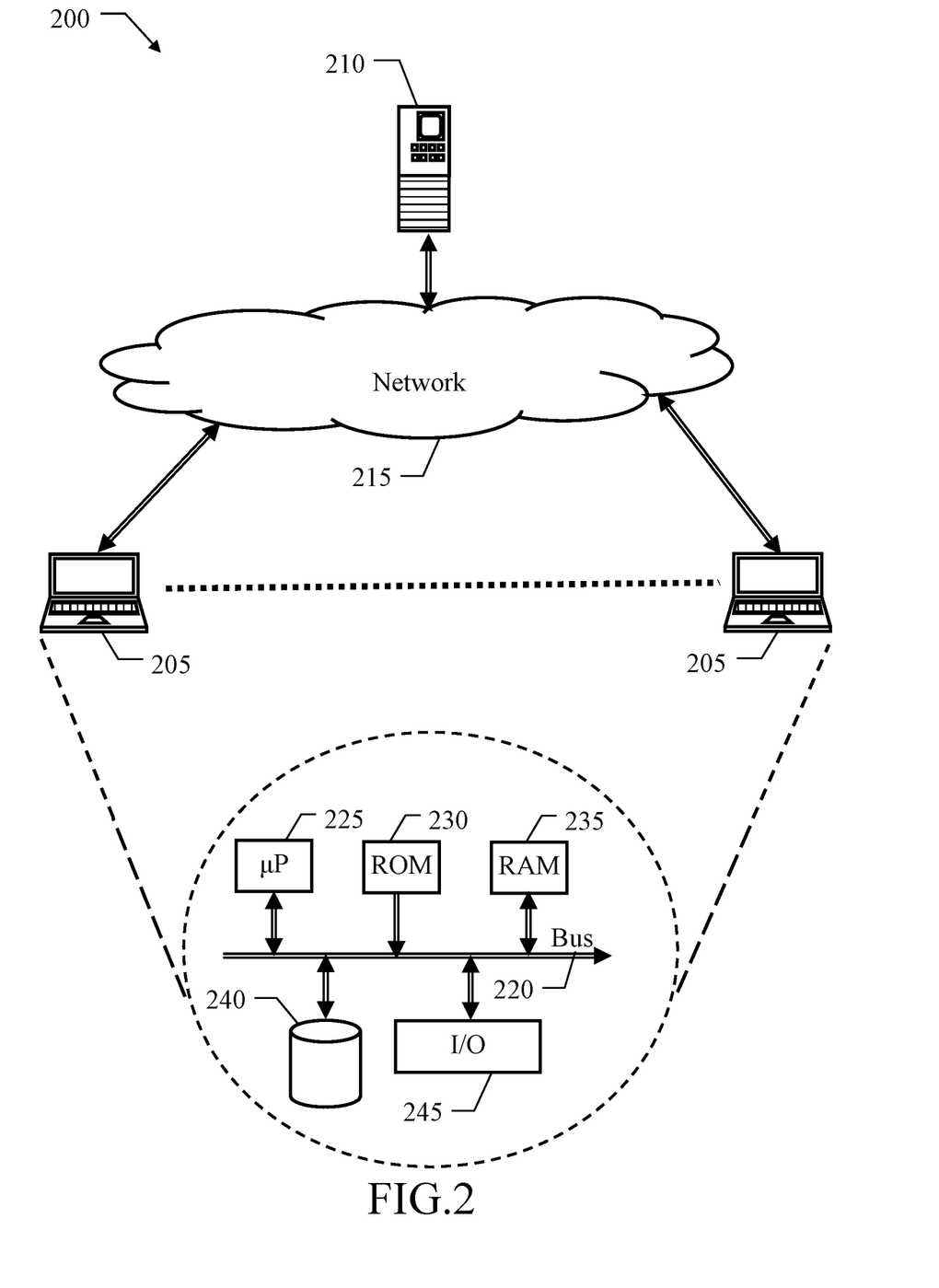
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein an embodiment of the present disclosure may be practiced.

The computing infrastructure 200 comprises a plurality of client computing systems, or simply clients 205 that are used by the participants to the call and a server computing system, or simply server 210 that manages the call; for example, the clients 205 are Personal Computers (PCs) of the participants and the server 210 is implemented in a data center of a service provider offering a corresponding call service. The clients 105 and the server 110 are connected to a telecommunication network 215 (for example, based on the Internet) for communicating among them.

Each of the above-mentioned computing systems (i.e., clients 205 and server 210) comprises several units that are connected among them through a bus structure 220 with one or more levels (with an architecture that is suitably scaled according to the type of the computing system 205,210). Particularly, a microprocessor (µP) 225, or more, provides a logic capability of the computing system 205,210; a non-volatile memory (ROM) 230 stores basic code for a bootstrap of the computing system 205,210 and a volatile memory (RAM) 235 is used as a working memory by the microprocessor 225. The computing system 205,210 is provided with a mass-memory 240 for storing programs and data (for example, an SSD for each client 205 and storage devices of the corresponding data center for the server 210). Moreover, the computing system 205,210 comprises a number of controllers for peripherals, or Input/Output (I/O) units, 245; for example, as far as relevant to the present disclosure the peripherals 245 of each client 205 comprise a network adapter (NIC) for connecting to the telecommunication network 215, a microphone for recording (input) sound, comprising (input) speech of the corresponding participant to the call, a loudspeaker for reproducing (output) sound, comprising (output) speech of the other participants to the call, and a drive for reading/writing removable storage units (such has of USB type), whereas the peripherals 245 of the server 210 comprise a network card for plugging the server 210 into the data center and then connecting it to a console of the data center for its control (for example, a personal computer, also provided with a drive for reading/writing removable storage units, such as of USB type) and to a switch/router sub-system of the data center for accessing the telecommunication network 215.

Figure 3:
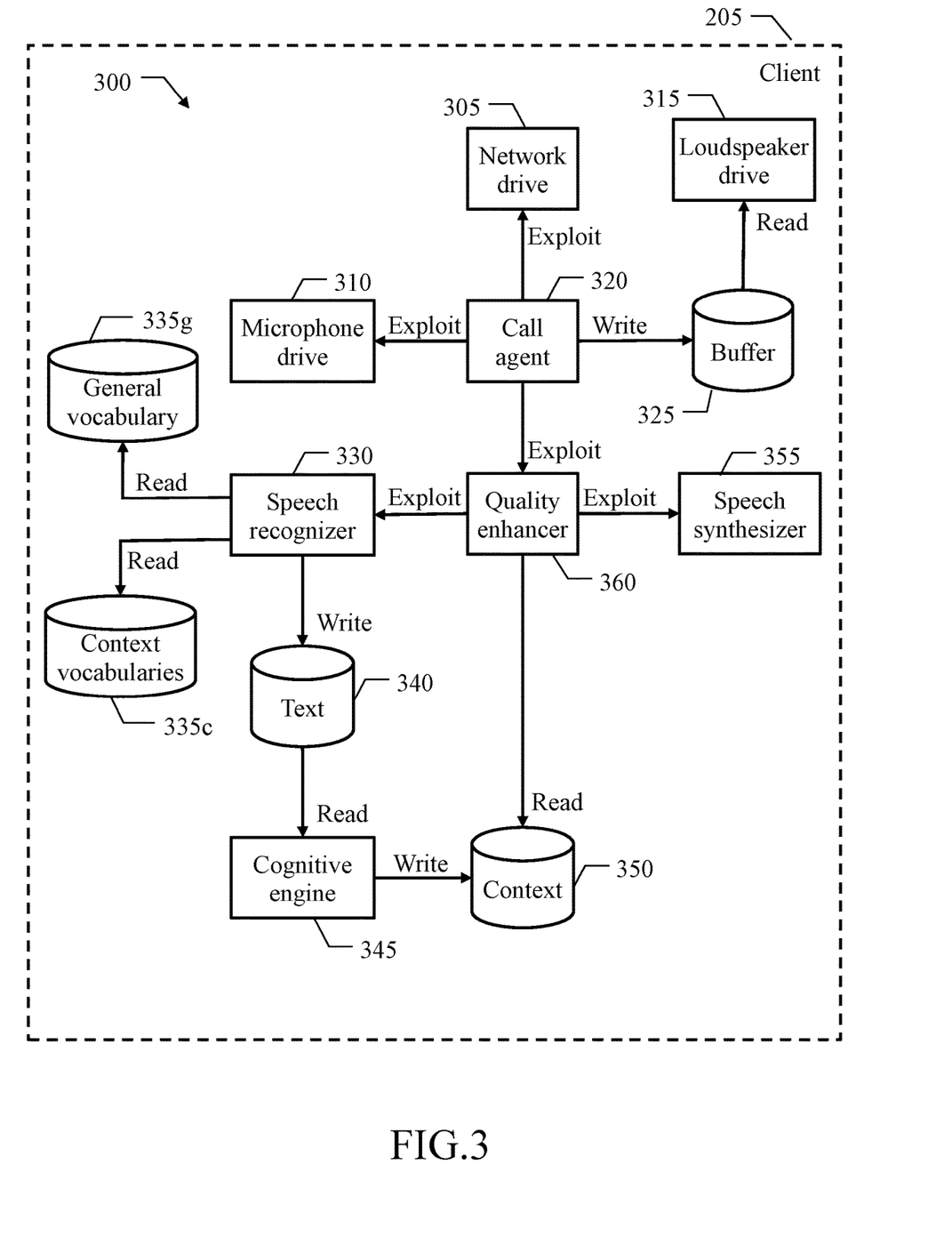
FIG. 3 shows the main software components that may be used to implement the solution according to an embodiment of the present disclosure.

With reference now to FIG. 3, the main software components are shown that may be used to implement embodiments of the present disclosure.

Particularly, all the software components (programs and data) are denoted as a whole with the reference 300. The software components 300 are typically stored in the mass memory and loaded (at least partially) into the working memory of each client 205 (only one shown in the figure) when the programs are running, together with an operating system and other application programs (not shown in the figure). The programs are initially installed into the mass memory, for example, from removable storage units or from the telecommunication network. In this respect, each program may be a module, segment or portion of code, which comprises one or more executable instructions for implementing the specified logical function.

A network drive 305 drives the network adapter, a microphone drive 310 drives the microphone and a loudspeaker drive 315 drives the loudspeaker. A call agent 320 controls each call that is in progress on the client 205 for its user as participant thereto. The call agent 320 exploits the network drive 305 for communicating with a call manager running on the server for managing the call (not shown in the figure). The call agent 320 exploits the microphone drive 310 for registering the input sound at the location of the client 205, comprising any input speech of its participant, into a corresponding (input) audio signal to be transmitted to the clients of the other participants via the call manager. The call agent 320 writes a reproduction buffer 325, which is read by the loudspeaker driver 315. The reproduction buffer 325 is used to store an (output) audio signal representing the output sound received from the clients of the other participants, comprising any output speech thereof, via the call manager; the reproduction buffer 325 has a FIFO structure for storing the output audio signal temporarily (for example, with a capacity corresponding to 5-10 minutes of reproduction of the output sound), so as to allow reproducing the output sound without interruption even in case of brief transmission problems of the output audio signal.

In the embodiments of the present disclosure, the call agent 320 exploits a quality enhancer 360; the quality enhancer 360 is used to enhance the quality of the reproduction of the output speech (of the other participants to the call) as mentioned above. For this purpose, the quality enhancer 360 exploits a speech recognizer 330 (for example, Watson speech-to-text by IBM Corporation); the speech recognizer 330 is used to recognize the text from the output speech (contained in the output sound represented in the output audio signal). For this purpose, the speech recognizer 330 reads a general vocabulary 335g and a plurality of context vocabularies 335c. The general vocabulary 335g is of general purpose; the context vocabularies 335c are instead specific for different contexts, such as information technology, electronics, marketing, finance, sport and so on (with each context having one or more corresponding context vocabularies 335c).

Each (general/context) vocabulary 335g,335c defines a corresponding set of words that may be recognized in the speech (each one defined by the smallest sequence of phonemes that may be uttered in isolation with a meaning in a corresponding language); for each word, the vocabulary 335g,335c indicates its written representation (defined by one or more graphemes, such as letters of an alphabet) and one or more pronunciation thereof (defined by its phonemes, such as in the IPA representation). The speech recognizer 330 writes a text file 340; the text file 340 stores a representation (in digital form) of the text that has been recognized (or at least its most recent part, such as for the last 30-60 minutes of reproduction of the output sound). A cognitive engine 345 (for example, based on a neural network) determines a context of the call from the corresponding text. The cognitive engine 345 reads the text file 340. Moreover, the cognitive engine 345 writes a context register 350, which is read by the quality enhancer 360; the context register 350 stores an indication of the context of the call, together with one or more metadata defining it. The quality enhancer 360 further exploits a speech synthesizer 355 (for example, Watson text-to-speech by IBM Corporation, trademarks thereof); the speech synthesizer 355 is used to synthetize the enhanced speech from the enhanced text (by producing a corresponding sound artificially that mimics the human voice).

Figure 4A:
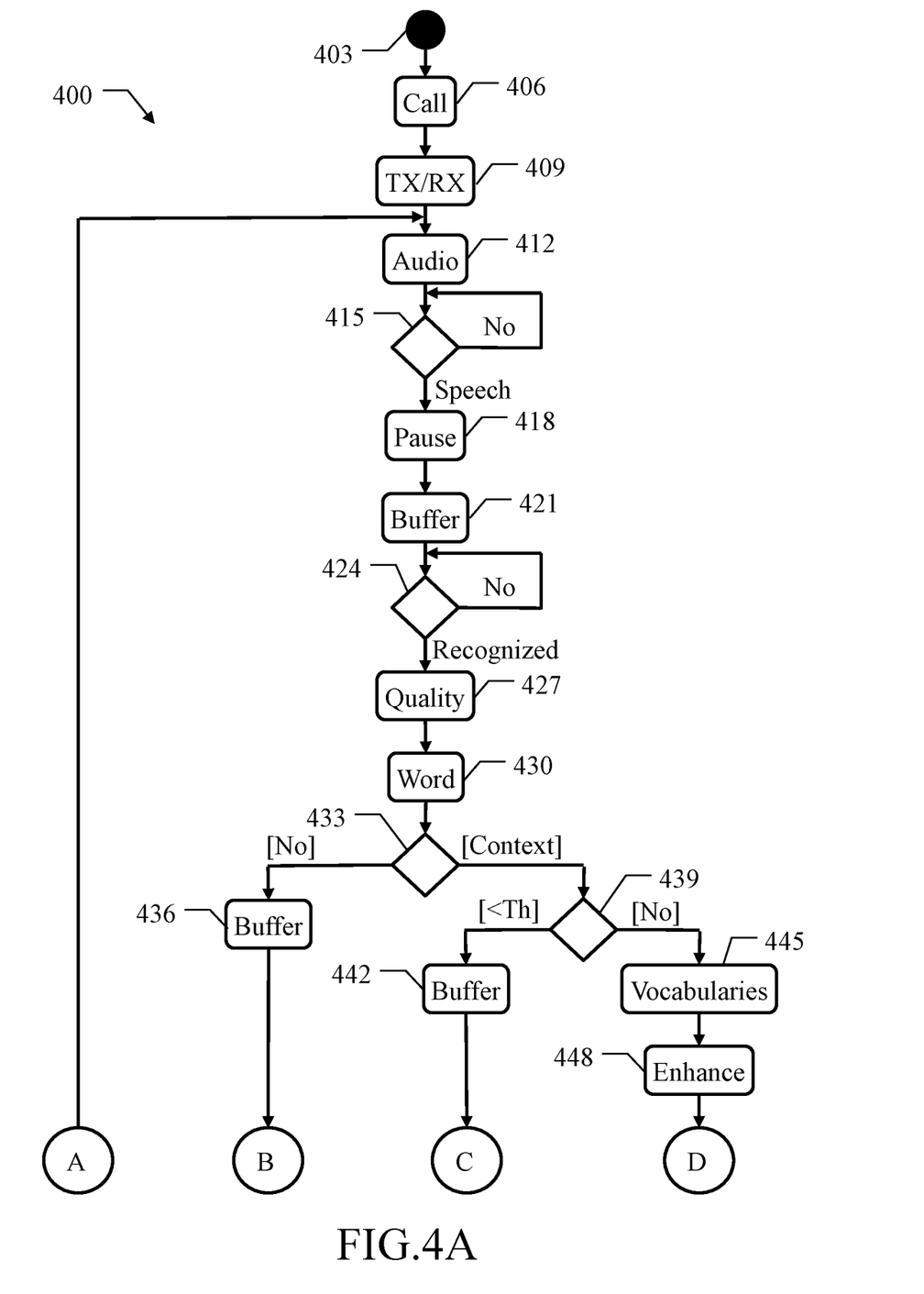
FIG. 4A-FIG. 4B show a flowchart describing the flow of activities relating to an implementation of the solution according to an embodiment of the present disclosure.
Figure 4B:
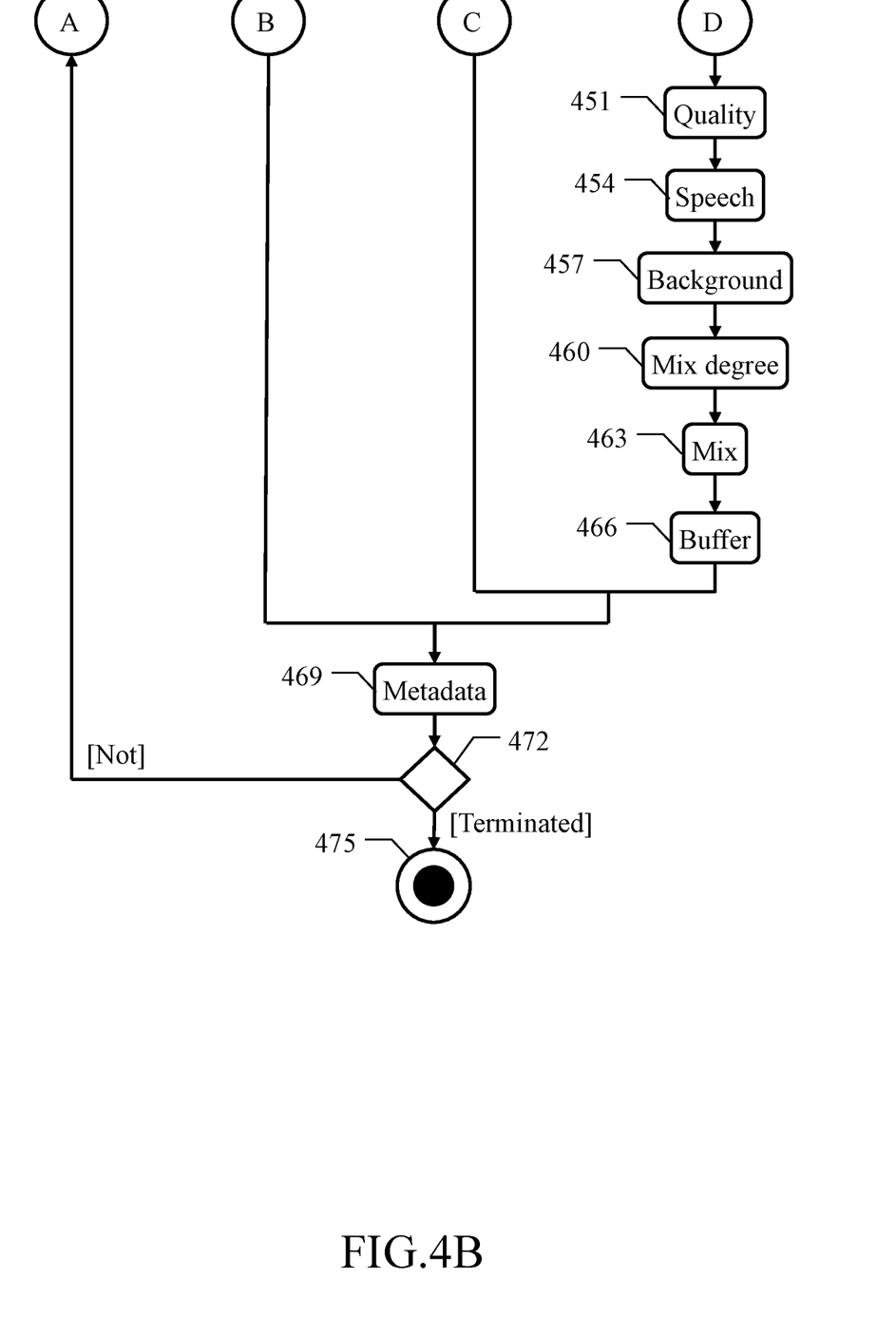

With reference now to FIG. 4A-FIG. 4B, a flowchart is shown describing the flow of activities relating to an implementation of embodiments of the present disclosure. In this respect, each block may correspond to one or more executable instructions for implementing the specified logical function on a generic client.

Particularly, the diagram can represent an exemplary process that may be used to enhance the reproduction of the speech during a call with a method 400. The process begins at the black start circle 403 and then passes to block 406 as soon as a user of a generic client enters the call as participant thereto; for example, the user exploits the call agent to authenticate with the call manager (running on the server) and then to submit a corresponding request thereto or s/he exploits the call agent to accept a corresponding request received from the call manager. In response thereto, the call agent at block 409 starts controlling the call, thereby allowing the participant to communicate with the other participants by speaking/listening and possibly sharing multimedia content (e.g., video, images, data, documents, etc.). For this purpose, the call agent can continually transmit an (input) call signal representing the information provided by the participant to the call manager (via the network drive) and can receive an (output) call signal from the call manager (via the network drive) representing the information provided by the other participants to the call (for example, both of them in MP4 format).

The call signal can be received in streaming, i.e., continually during the call for the reproduction of the corresponding information substantially in real-time (and in any case before receiving the call signal of the whole call). As far as relevant to the present disclosure, the call agent can command the microphone to record the input sound at the location of the client into the corresponding input audio signal that is added to the input call signal (transmitted to the call manager); at the same time, as described in detail in the following, the call agent can control the reproduction of the output audio signal comprised in the output call signal (received from the call manager) that has been generated by the call manager mixing the input audio signals received from the clients of the other participants to the call.

For this purpose, if necessary, the call agent at block 412 can isolate the output audio signal (for example, in MP3 format) from the output call signal. The speech recognizer at block 415 can continually analyze the (output) audio signal searching for the representation of the (output) speech of the other participants to the call (for example, by applying spectral analysis techniques). As soon as the speech recognizer detects the speech, the quality enhancer at block 418 can determine a sound segment of the audio signal representing a pause in the speech (if any); the sound segment can start after an end of a previous sound segment (initialized to the beginning of the call) and can end at the detection of the speech (no sound segment being determined when the speech is detected immediately). The quality enhancer at block 421 can add the sound segment to the reproduction buffer for its next reproduction by the loudspeaker driver.

The speech recognizer at block 424 can continually analyze the audio signal searching for the representation of a word in the corresponding speech by using the general vocabulary. Particularly, the speech recognizer can determine the (longest) word whose pronunciation indicated in the general vocabulary best matches the speech in the audio signal as soon as possible, for example, with a degree of correctness higher than a minimum (correctness) threshold, e.g., 20-40%. In response thereto, the speech recognizer can add the recognized word to the text file. The quality enhancer at block 427 can calculate the quality indicator of the word; for example, the quality indicator can be based on the degree of correctness of the word determined by the speech recognizer, on an initial value of the degree of correctness as determined by the speech recognizer at a first iteration and on the number of further iterations required to have the degree of correctness higher than the correctness threshold, on a trend of the degree of correctness of the words that have been recognized before in the call (for example, logged in the text file by the speech recognizer), and so on (such as a weighted sum thereof normalized to range from 0 to 1). The quality enhancer at block 430 can determine a further sound segment of the audio signal representing the word in the speech; as above, the sound segment can start after an end of a previous sound segment (initialized to the beginning of the call) and can end at the recognition of the word.

The flow of activity branches at block 433 according to whether a context of the call has been determined (as indicated in the corresponding register). If not, the quality enhancer at block 436 can add the sound segment to the reproduction buffer for its next reproduction by the loudspeaker driver (independent of its quality indicator). Conversely, if the context of the call has already been determined, the flow of activity branches at block 439 according to the quality indicator of the word. If the quality indicator of the word is (possibly strictly) higher than a threshold level deemed acceptable (for example, 0.5-0.7) the quality enhancer at block 442 can add the sound segment to the reproduction buffer for its next reproduction by the loudspeaker driver.

Conversely, if the quality indicator of the word is (possibly strictly) lower than the threshold level, then the quality enhancer can try to enhance the recognition of the word in the sound segment. For this purpose, the quality enhancer at block 445 can select the context vocabularies corresponding to the context of the call (retrieved from the corresponding register). The speech recognizer at block 448 again can analyze the sound segment searching for the representation of a word in the corresponding speech by further using the (selected) context vocabularies. Particularly, as above, the speech analyzer can determine the (enhanced) word whose pronunciation indicated in the general/context vocabularies best matches the sound segment, with a degree of correctness higher than the (original) word that has been recognized before; for this purpose, the speech recognizer may also apply further enhancement techniques to determine the degree of correctness, for example, by evaluating a number of phonetical matches between the sound segment and the pronunciation of the words in the general/context vocabularies. In response thereto, the speech recognizer can replace the original word with the enhanced word in the text file (if necessary).

The quality enhancer at block 451 can calculate the quality indicator of the enhanced word as above. The speech synthesizer at block 454 can synthetize the enhanced speech corresponding to the enhanced word represented by a corresponding (enhanced) audio signal (for example, mimicking a voice of the corresponding participant learned during the call). The quality enhancer at block 457 can extract the representation of a background from the sound segment, as defined by any sound different from the corresponding speech (for example, by applying spectral analysis techniques). The quality enhancer at block 460 can calculate a mix degree of the enhanced word with the background. The mix degree can depend on the quality indicator of the enhanced word, with the higher the quality indicator the lower the mix degree (for example, setting the complement to 1 of the quality indicator).

Moreover, the mix degree may also depend on the trend of the quality indicator of the words that have been recognized in the loops during the searching of the enhanced word, on the trend of the quality indicator of the (original/enhanced) words that have been recognized before in the call (for example, logged in the text file by the speech recognizer), on the trend of the mix degrees that have been calculated before in the call (for example, logged in the text file by the speech recognizer as well) and so on (such by applying corresponding corrective factors). The quality enhancer at block 463 can generate the corresponding enhanced sound segment by mixing the enhanced word with the background according to the mix degree (with the higher the mix degree the higher the weight of the enhanced speech therein).

The quality enhancer at block 466 can add the enhanced sound segment to the reproduction buffer for its next reproduction by the loudspeaker driver (instead of the corresponding sound segment). In this way, a prevalence of the enhanced speech in the enhanced sound segment (as defined by the mix degree) can correspond to a clarity of the enhanced word in the enhanced sound segment (as defined by its quality indicator); this can smooth the transition between any pair of adjacent sound segment and enhanced sound segment (thereby making the reproduction of the enhanced sound more fluid).

In any case, the flow of activity can merge again at block 469 from the block 436, the block 442 or the block 466. At this point, the cognitive engine can extract possible metadata from the text that has been recognized, which metadata are used to determine the context of the speech incrementally (with the context register that is updated accordingly).

The call agent at block 472 can verify whether the participant is still participating to the call. If so, the process can return to block 412 to repeat the operations. Conversely, once the involvement of the participant in the call has been terminated (for example, in response to a manual command submitted by the participant to the call agent for leaving the call or to a command received from the conference manager for closing the call), the process can end at the concentric white/black stop circles 475.

Accordingly, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/a should be intended as one or more items (unless expressly indicated otherwise), and the term means for (or any means-plus-function formulation) should be intended as any structure adapted or configured for carrying out the relevant function.

For example, an embodiment provides a method for enhancing speech reproduction on a computing system. However, the method may be used in any context (for example, during video/audio calls, delivery of live/pre-recorded contents and so on).

In an embodiment, the method comprises the following steps under the control of a computing system. However, the computing system may be of any type (see below).

In an embodiment, the method comprises receiving (by the computing system) an audio signal representing a sound comprising a speech. However, the audio signal may be in any format readable by the computing system (for example, MP3, WMA, AC-3 and so on) and it may be received in any way (for example, in streaming, downloaded and so on); the audio signal may represent any sound (for example, isolated speech, speech with music/noise in the background and so on) comprising any speech (for example, a chat, a lecture and so on).

In an embodiment, the method comprises recognizing (by the computing system) a text from the audio signal. However, the text may be recognized in any way (for example, based on Hidden Markov models, machine learning techniques, neural networks and so on).

In an embodiment, the text comprises a sequence of text segments that are recognized from a corresponding sequence of sound segments of the sound. However, the text segments and the sound segments may be of any type (for example, representing words, morphemes, phrases, clauses, sentences and so on).

In an embodiment, the method comprises determining (by the computing system) corresponding quality indicators of said recognizing the text segments. However, the quality indicators may be of any type (for example, continuous/discrete, with any value and so on) and they may be determined in any way (for example, according to partial, different and additional features with respect to the ones mentioned above, either individually or in any combination thereof).

In an embodiment, the method comprises generating (by the computing system) corresponding enhanced text segments from any text segments whose quality indicators do not reach a threshold level. However, this operation may be triggered in any way (for example, as soon as the quality indicator falls below any value, after this happens for two or more consecutive text segments and so on).

In an embodiment, the enhanced text segments are generated according to additional information with respect to the corresponding sound segments. However, the enhanced text segments may be generated in any way (for example, according to a context of the speech, a current sentence and so on).

In an embodiment, the method comprises synthetizing (by the computing system) corresponding enhanced speech segments from the enhanced text segments. However, the enhanced speech segments may be synthetized in any way (for example, based on concatenation, unit selection, diphone, formant, articulatory, deep learning and so on techniques).

In an embodiment, the method comprises reproducing (by the computing system) an enhanced sound comprising the corresponding sound segments and corresponding enhanced sound segments for the text segments whose quality indicators reach and do not reach, respectively, the threshold level. However, the enhanced sound may be generated in any way (for example, by simply concatenating the sound segments and enhanced sound segments, by smoothing the concatenation between each pair of sound segment and enhanced sound segment, and so on) and it may be reproduced in any way (for example, via a reproduction buffer, directly and so on).

In an embodiment, the enhanced sound segments are based on the corresponding enhanced speech segments. However, the enhanced sound segments may be based on the corresponding enhanced speech segments in any way (for example, obtained by mixing the speech segments with corresponding background segments, by setting them to the speech segments directly and so on).

Further embodiments provide additional advantageous features, which may however be omitted at all in a basic implementation.

Particularly, in an embodiment the method comprises generating (by the computing system) the enhanced text segments according to a context of the speech. However, the context may be determined in any way (for example, among pre-determined contexts or freely, according to the text, a title of the speech, manually and so on) and it may be used to generate the enhanced text segments in any way (for example, by using corresponding context vocabularies, specific inference rules and so on).

In an embodiment, the method comprises determining (by the computing system) the context of the speech according to the text. However, the context may be determined according to the text in any way (for example, with cognitive, machine learning, artificial intelligence and so on techniques).

In an embodiment, the method comprises selecting (by the computing system) one or more context vocabularies according to the context of the speech. However, the context vocabularies may be in any number (for example, pre-defined, determined at run-time and so on) and of any type (for example, stored locally, accessed remotely and so on).

In an embodiment, the method comprises generating (by the computing system) the enhanced text segments according to the context vocabularies. However, the context vocabularies may be used in any way to generate the enhanced text segments (for example, in addition to a general vocabulary, stand-alone and so on).

In an embodiment, the sound segments and the text segments represent corresponding words or pauses of the speech. However, the text segments may represent any entities (for example, words or pauses, only words or more generally any other speech units).

In an embodiment, the method comprises isolating (by the computing system) corresponding background segments from the sound segments. However, the background segments may be isolated in any way (for example, with spectral analysis, deep learning and so on techniques).

In an embodiment, the background segments represent a background differing from the speech. However, the background may be of any type (for example, noise, music, interferences and so on).

In an embodiment, the method comprises generating (by the computing system) the enhanced sound segments by mixing the corresponding enhanced speech segments and background segments. However, the enhanced speech segments and the background segments may be mixed in any way (for example, according to variable mix degrees, in a fixed way and so on).

In an embodiment, the method comprises determining (by the computing system) corresponding further quality indicators for the enhanced text segments. However, the further quality indicators may be determined in any way (either the same or different with respect to the quality indicators).

In an embodiment, the method comprises setting (by the computing system) corresponding mix degrees of said mixing the corresponding enhanced speech segments and background segments according to the further quality indicators of the corresponding enhanced text segments. However, the mix degrees may be set according to the further quality indicators in any way (for example, according to partial, different and additional features with respect to the ones mentioned above, either individually or in any combination thereof); alternatively, it is possible to set the mix degrees in a similar way according to the quality indicators of the corresponding (original) words.

In an embodiment, the method comprises generating (by the computing system) the enhanced sound segments by mixing the corresponding enhanced speech segments and background segments according to the corresponding mix degrees. However, the enhanced speech segments and the background segments may be mixed in any way according to the corresponding mix degrees (for example, modulating their volume levels, frequency contents, dynamics and so on).

In an embodiment, the method comprises setting (by the computing system) each of the mix degrees further according to a trend of the mix degrees. However, the mix degree may be set according to this trend in any way (for example, by applying a corresponding corrective factor, by using it in a weighted sum and so on).

In an embodiment, the method comprises determining (by the computing system) each of the quality indicators according to a current quality, a quality trend and/or a number of iterations of said recognizing the corresponding text segment. However, each quality indicator may be determined according to partial, different and additional features, either individually or in any combination thereof.

In an embodiment, the method comprises receiving (by the computing system) a multimedia signal representing a multimedia content containing the sound. However, the multimedia content may be of any type (for example, containing video, images, data, documents and so on).

In an embodiment, the method comprises isolating (by the computing system) the audio signal from the multimedia signal. However, the audio signal may be isolated in any way or this operation may be omitted at all (for example, when the audio signal is provided already separated, alone in an audio call/conference and so on).

In an embodiment, the method comprises receiving (by the computing system) the audio signal in streaming over a telecommunication network. However, the audio signal may be received with any type of streaming (for example, multicast, unicast, peer-to-peer and so on) and over any telecommunication network (for example, a global, wide area or local network, based on wired, cellular or satellite connections and so on).

In an embodiment, the method comprises receiving (by the computing system) the audio signal during a call over the telecommunication network. However, the call may be of any type (for example, an audio/video call, a teleconference, a web-conference and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises one or more computer readable storage media that have program instructions collectively stored thereon; the program instructions arte readable by a computing system to cause the computing system to perform the same method. However, the computer program may be implemented as a stand-alone module, as a plug-in for a pre-existing software application (for example, the call agent) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, a personal computer, a smartphone, a tablet, a virtual machine and so on) with any number and type of devices for reproducing the enhanced sound (for example, one or more loudspeakers, earphones, headphones and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enhancing speech reproduction on a computing system, the method comprising:
    receiving, by the computing system, an audio signal representing a sound comprising a speech;
    recognizing, by the computing system, a text from the audio signal, the text comprising a sequence of text segments being recognized from a corresponding sequence of sound segments of the sound;
    determining, by the computing system, quality indicators corresponding to the sequence of text segments;
    generating, by the computing system, corresponding enhanced text segments from any text segments wherein the quality indicators do not reach a threshold level, the enhanced text segments being generated according to additional information with respect to the corresponding sequence of sound segments;

synthetizing, by the computing system, corresponding enhanced speech segments from the enhanced text segments; and reproducing, by the computing system, an enhanced sound comprising a portion of the corresponding sequence of sound segments wherein the quality indicators reach the threshold level and corresponding enhanced sound segments based on the corresponding enhanced speech segments.

2. The method according to claim 1, further comprising:
generating, by the computing system, the enhanced text segments according to a context of the speech.

3. The method according to claim 2, further comprising:
determining, by the computing system, the context of the speech according to the text.

4. The method according to claim 2, further comprising:
selecting, by the computing system, one or more context vocabularies according to the context of the speech; and generating, by the computing system, the enhanced text segments according to the one or more context vocabularies.

5. The method according to claim 1, wherein the sound segments, the enhanced sound segments, the text segments and the enhanced text segments represent corresponding words or pauses of the speech.

6. The method according to claim 1, further comprising:
isolating, by the computing system, corresponding background segments from the sound segments, the background segments representing a background differing from the speech; and generating, by the computing system, the enhanced sound segments by mixing the corresponding enhanced speech segments and the background segments.

7. The method according to claim 6, further comprising:
determining, by the computing system, corresponding further quality indicators for the enhanced text segments;

setting, by the computing system, corresponding mix degrees of said mixing the corresponding enhanced speech segments and the background segments according to the further quality indicators of the corresponding enhanced text segments; and generating, by the computing system, the enhanced sound segments by mixing the corresponding enhanced speech segments and the background segments according to the corresponding mix degrees.

8. The method according to claim 7, further comprising:
setting, by the computing system, the corresponding mix degrees further based on a trend of the corresponding mix degrees.

9. The method according to claim 1, further comprising:
determining, by the computing system, the quality indicators according to at least one of a current quality, a quality trend or a number of iterations of said recognizing the text from the audio signal.

10. The method according to claim 1, further comprising:
receiving, by the computing system, a multimedia signal representing a multimedia content containing the sound; and isolating, by the computing system, the audio signal from the multimedia signal.

11. The method according to claim 1, further comprising:
receiving, by the computing system, the audio signal in streaming over a telecommunication network.

12. The method according to claim 11, further comprising:

receiving, by the computing system, the audio signal during a call over the telecommunication network.

13. A computer program product for enhancing speech reproduction, the computer program product comprising:
one or more computer readable storage media having program instructions collectively stored on said one or more computer readable storage media, the program instructions comprising:
program instructions to receive an audio signal representing a sound comprising a speech;
program instructions to recognize a text from the audio signal, the text comprising a sequence of text segments being recognized from a corresponding sequence of sound segments of the sound;
program instructions to determine quality indicators corresponding to the sequence of text segments;
program instructions to generate corresponding enhanced text segments from any text segments wherein the quality indicators do not reach a threshold level, the enhanced text segments being generated according to additional information with respect to the corresponding sequence of sound segments;
program instructions to synthetize corresponding enhanced speech segments from the enhanced text segments; and
program instructions to reproduce an enhanced sound comprising a portion of the corresponding sequence of sound segments wherein the quality indicators reach the threshold level and corresponding enhanced sound segments based on the corresponding enhanced speech segments.

14. The computer program product according to claim 13, further comprising:
program instructions to generate the enhanced text segments according to a context of the speech.

15. The computer program product according to claim 14, further comprising:
program instructions to determine the context of the speech according to the text.

16. The computer program product according to claim 14, further comprising:
program instructions to select one or more context vocabularies according to the context of the speech; and
program instructions to generate the enhanced text segments according to the one or more context vocabularies.

17. The computer program product according to claim 13, wherein the sound segments, the enhanced sound segments, the text segments and the enhanced text segments represent corresponding words or pauses of the speech.

18. The computer program product according to claim 13, further comprising:
program instructions to isolate corresponding background segments from the sound segments, the background segments representing a background differing from the speech; and
program instructions to generate the enhanced sound segments by mixing the corresponding enhanced speech segments and the background segments.

19. The computer program product according to claim 18, further comprising:
program instructions to determine corresponding further quality indicators for the enhanced text segments;
program instructions to set corresponding mix degrees of said mixing the corresponding enhanced speech segments and the background segments according to the further quality indicators of the corresponding enhanced text segments; and program instructions to generate the enhanced sound segments by mixing the corresponding enhanced speech segments and the background segments according to the corresponding mix degrees.

20. A system for enhancing speech reproduction, wherein the system comprises:

a circuitry for receiving an audio signal representing a sound comprising a speech;

a circuitry for recognizing a text from the audio signal, the text comprising a sequence of text segments being recognized from a corresponding sequence of sound segments of the sound;

a circuitry for determining quality indicators corresponding to the sequence of text segments;

a circuitry for generating corresponding enhanced text segments from any text segments wherein the quality indicators do not reach a threshold level, the enhanced text segments being generated according to additional information with respect to the corresponding sequence of sound segments;

a circuitry for synthetizing corresponding enhanced speech segments from the enhanced text segments; and a circuitry for reproducing an enhanced sound comprising a portion of the corresponding sequence of sound segments wherein the quality indicators reach the threshold level and corresponding enhanced sound segments based on the corresponding enhanced speech segments.

* * * * *